A. MEKENNEY.
Fertilizer Distributor.

No. 200,324. Patented Feb. 12, 1878.

WITNESSES

INVENTOR

UNITED STATES PATENT OFFICE.

ALENDO MEKENNEY, OF MIDDLEBOROUGH, MASSACHUSETTS.

IMPROVEMENT IN FERTILIZER-DISTRIBUTERS.

Specification forming part of Letters Patent No. 200,324, dated February 12, 1878; application filed March 31, 1876.

*To all whom it may concern:*

Be it known that I, ALENDO MEKENNEY, of Middleborough, in the county of Plymouth and State of Massachusetts, have invented an Improved Fertilizer-Distributing and Seeding Machine, of which the following is a specification:

The invention combines in one machine a fertilizer-distributer and a seed-sower. The said sower, as in this specification arranged and combined, is not claimed as new; but the operation of the whole machine is described with that part herein claimed as new.

The nature of the invention consists in combining a driving or motive wheel or wheels of a carriage with a cylindrical box, so arranged as to rotate by means of direct contact with said driving wheel or wheels—that is, a cylindrical box containing seed or fertilizing substance is arranged upon uprights attached to other parts of said carriage, so that the axis of the cylindrical box rests upon said uprights, and the said box impinges against the driving wheel or wheels, and the revolution of the said driving wheel or wheels causes the said cylindrical box to revolve; and so I claim that.

Figure 1:
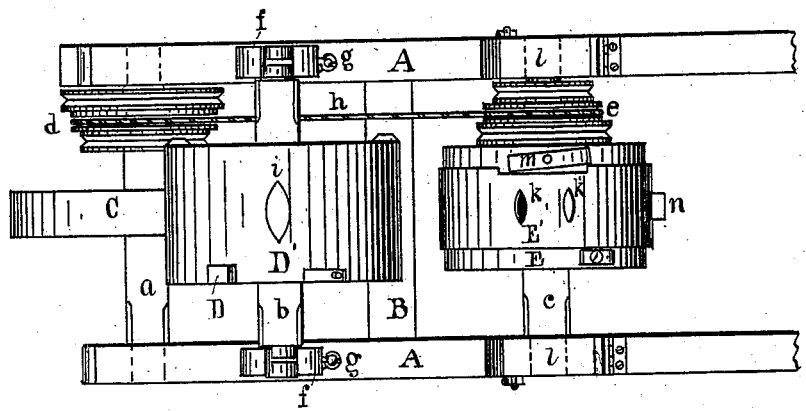

In the accompanying drawings, Figure 1 represents a plan view of the machine, in which are shown the frame A A, to which all of the parts of the machine are attached, (as well as the plow, spreader, and roller, which are not shown in the drawings;) the cross-piece B; the moving wheel C, which rotates in advance of the plow, the plow being attached to or near the cross-piece B, and immediately following the wheel C; the fertilizer-receptacle D, surrounded by its casing D', having the opening $i$ through to the receptacle and casing; the seed-receptacle E, surrounded by its casing E', in which is the opening $k$, through both receptacle and casing, and $k'$, in which only the opening of the casing is shown; the pulleys $d$ and $e$, and the band connecting the same, and all of the other parts of the machine.

Figure 2:
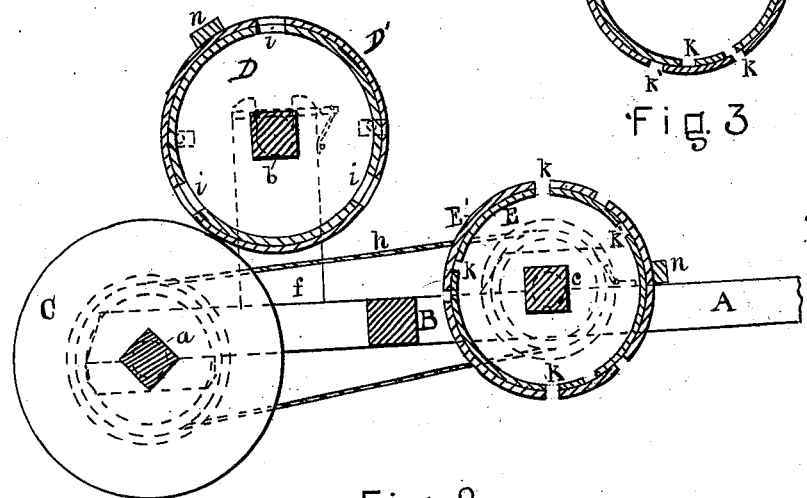

Fig. 2 shows a vertical section of the machine, in which the openings $i\ i\ i$ are fully open through both receptacle and casing. By turning the casing D' the openings $i\ i\ i$ may be partially or entirely closed when the fertilizer is not needed. Said figure also shows two openings, $k\ k$, in the seed-box E, through both the receptacle and casing, the same as in Fig. 1, where $k$ is represented as closed. These two are opened when it is desired to drop the seed in hills.

Figure 3:
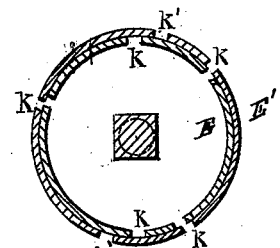

Fig. 3 represents the seed-box, with openings $k\ k\ k$ partly open, when seed is to be dropped continuously. The holes, by moving the casing E', may be left entirely open for large seed, or closed entirely, or partly open, according to the size of the seed or quantity to be dropped or deposited. Of course, any number of holes may be used, as found expedient. The fertilizer may be introduced into the receptacle by an aperture at either end of the receptacle; and so in regard to the seed-receptacle, though removing the end next the pulley may be most convenient.

It will be observed that the receptacle D rests upon the wheel C, and the motion of said wheel C causes the revolution of the said receptacle, while at the same time, by means of the pulleys $d\ e$ and the band $h$, the receptacle E is revolved.

It will be observed, also, that the axle $b$ rests loosely in the journal of the support $f$, so that if the periphery of the wheel C be clogged the revolution of the receptacle will not be stayed; also, that the pulleys $d\ e$ are conical, so that the band may be shortened or lengthened in depositing seed more or less distant apart in hills.

This machine, when fully equipped with plow, spreader, and roller, performs the office of furrowing for seed, dropping the fertilizer and the seed either continuously or in hills, covering the furrow, and rolling it down at the same time.

The machine is simple in construction and entirely practical in its operation. By it the fertilizer is dropped in uniform quantities the entire distance to be used. The seed also, of whatever size, may be sowed evenly and continuously or in hills.

When the fertilizer and the seed are placed in their respective receptacles, the casings are adjusted as to quantity or size of the seed, and whether dropped continuously or in hills, and when the dropping is finished the casings may again be adjusted to close entirely the openings, preserving the whole for future use.

There is another advantage in the machine not found in other machines for the same purpose—namely, the convenient devices for removing and replacing the seed-box and the fertilizing-receptacle to fill with seed, &c.

The journals of the fertilizing-receptacle are upon the top of the uprights $f f$, held in position by the pins $g g$; and the axle of the seed-receptacle revolves on the string-pieces A A, and is held in its place by the cap-squares $l l$; and as this receptacle must be filled often, by raising the cap-squares, the receptacle can be taken out, filled, and replaced with ease and dispatch.

I am aware that most of the parts of this machine, independently, are not new in principle; but the combination of all of the parts together in one machine is new and of great practical utility.

What I claim as my invention, and desire to secure by Letters Patent, is—

The combination, with the driving wheel or wheels of a carriage, of a cylindrical seed-box arranged to rotate by means of direct contact, substantially as described.

ALENDO MEKENNEY.

Witnesses:
ICHABOD F. ATWOOD,
EMERY F. ATWOOD.